(12) United States Patent
Inamori

(10) Patent No.: US 8,602,350 B2
(45) Date of Patent: Dec. 10, 2013

(54) FLYING BODY HAVING AN UPPER BLOWER EQUIPPED WITH ROTATING BLADES FOR PUMPING AIR IN AXIAL FLOW DIRECTION

(76) Inventor: Kiyoko Inamori, Tokyo (JP)

( * ) Notice: Subject to any disclaimer, the term of this patent is extended or adjusted under 35 U.S.C. 154(b) by 305 days.

(21) Appl. No.: 12/863,527

(22) PCT Filed: Feb. 5, 2008

(86) PCT No.: PCT/JP2008/051881
§ 371 (c)(1),
(2), (4) Date: Jul. 19, 2010

(87) PCT Pub. No.: WO2009/098758
PCT Pub. Date: Aug. 13, 2009

(65) Prior Publication Data
US 2010/0294878 A1 Nov. 25, 2010

(51) Int. Cl.
*B64C 29/00* (2006.01)
*B64C 39/06* (2006.01)

(52) U.S. Cl.
USPC .............. 244/23 C; 244/12.2; 446/34; 446/46

(58) Field of Classification Search
USPC ......... 244/12.1–12.3, 12.5, 23 B–23 D, 23 R; 446/34, 56, 46
See application file for complete search history.

(56) References Cited

U.S. PATENT DOCUMENTS

| | | | |
|---|---|---|---|
| 3,034,747 A | 5/1962 | Lent | |
| 3,041,009 A | 6/1962 | Wharton | |
| 3,195,665 A | 7/1965 | Beardsley | |
| 3,276,723 A | 10/1966 | Miller et al. | |
| 3,630,470 A * | 12/1971 | Elliott | 244/21 |
| 3,697,020 A * | 10/1972 | Thompson | 244/12.2 |
| 6,179,247 B1 * | 1/2001 | Milde, Jr. | 244/23 A |

(Continued)

FOREIGN PATENT DOCUMENTS

| | | | |
|---|---|---|---|
| FR | 2707248 A1 * | 1/1995 | B64C 29/00 |
| FR | 2880868 A1 | 7/2006 | |

(Continued)

OTHER PUBLICATIONS

PCT/JP2008/051881 filed Feb. 5, 2008, Search Report, 3 pages.

(Continued)

*Primary Examiner* — Joseph W Sanderson
*Assistant Examiner* — Timothy Schwarz
(74) *Attorney, Agent, or Firm* — Andrew F. Young, Esq.; Lackenbach Siegel, LLP

(57) ABSTRACT

A flying body is provided with: an air blower including an upper blower equipped with rotating blades for pumping air in an axial flow direction and a lower blower equipped with rotating blades for pumping the air pumped from the upper blower in a centrifugal direction, with the upper blower and the lower blower disposed on the same axis and rotating in the opposite directions to each other; and a fixed wing having at least an inner surface formed in a skirt shape to provide a circular conical surface, and mounted concentrically with the air blower. The lower blower is mounted below an inner top face of the fixed wing such that the air pumped and sent in the centrifugal direction strikes the circular conical surface (T) of the fixed wing. The top portion of the fixed wing has no opening except for a passage through which an axial flow is pumped from the upper blower to the lower blower.

15 Claims, 8 Drawing Sheets

(56) References Cited

U.S. PATENT DOCUMENTS

| | | | |
|---|---|---|---|
| 6,270,038 B1* | 8/2001 | Cycon et al. | 244/12.3 |
| 6,371,406 B1* | 4/2002 | Corcoran | 244/12.2 |
| 6,375,117 B1* | 4/2002 | Cain | 244/23 R |
| 6,471,473 B1* | 10/2002 | Wilkinson et al. | 415/182.1 |
| 6,520,449 B2* | 2/2003 | Illingworth | 244/12.1 |
| 6,547,180 B1* | 4/2003 | Cassidy | 244/12.5 |
| 6,616,094 B2* | 9/2003 | Illingworth | 244/12.1 |
| 6,666,403 B1* | 12/2003 | Follensbee | 244/12.2 |
| 6,672,539 B1* | 1/2004 | Schoeneck | 244/12.2 |
| 6,817,570 B2* | 11/2004 | Yoeli | 244/12.1 |
| 7,342,789 B2* | 3/2008 | Hall et al. | 361/701 |
| 2002/0125366 A1* | 9/2002 | Salas | 244/12.1 |
| 2004/0094662 A1* | 5/2004 | Sanders et al. | 244/12.5 |
| 2008/0083847 A1* | 4/2008 | Mau | 244/13 |
| 2008/0212282 A1* | 9/2008 | Hall et al. | 361/701 |
| 2008/0302920 A1* | 12/2008 | Mack | 244/23 R |
| 2010/0270419 A1* | 10/2010 | Yoeli | 244/12.1 |
| 2010/0270420 A1* | 10/2010 | Hansen | 244/12.2 |
| 2011/0168834 A1* | 7/2011 | Yoeli | 244/12.3 |

FOREIGN PATENT DOCUMENTS

| | | |
|---|---|---|
| FR | 421 036 | 2/2011 |
| JP | 60-076481 | 4/1985 |
| JP | 61-155653 | 7/1986 |
| JP | 05 042895 | 2/1993 |
| JP | 09-011991 | 1/1997 |
| JP | 11-115896 | 4/1999 |
| JP | 2003 117261 | 4/2003 |
| JP | 2008-137527 | 8/2008 |

OTHER PUBLICATIONS

EP 08710813.0 Supplementary European Search Report dated Apr. 12, 2012, 5 pages—English.

* cited by examiner

FLYING BODY HAVING AN UPPER BLOWER EQUIPPED WITH ROTATING BLADES FOR PUMPING AIR IN AXIAL FLOW DIRECTION

CROSS REFERENCE TO RELATED APPLICATIONS

This application is a National Phase Entry of PCT Patent Application Ser. No. PCT/JP2008/051881, filed Feb. 5, 2008, the entire contents of which is herein incorporated fully by reference.

FIGURE FOR PUBLICATION

FIG. 1

BACKGROUND OF THE INVENTION

1. Field of the Invention

The present invention relates to a flying body that levitates and flies in the air. This invention relating to a flying body is applicable to a toy aircraft as well as a manned aircraft and an unmanned aircraft.

2. Description of the Related Art

A conventional flying body operates propellers, a jet engine, a rocket engine or the like to produce thrust that propels the vehicle body forward, so that the wings travel relative to the air. This relative movement generates airflows on the upper and lower wing surfaces, thus producing aerodynamic lift that levitates the flying body. Accordingly, the flying body is required to be propelled forward at all times for producing the aerodynamic lift. As a result, the flying body cannot stop or hover in the air, except in special cases. If the flying body cannot move forward, the loss of aerodynamic lift results, and the crashing of the flying body because of stalling is unavoidable.

By contrast, a helicopter rotates its wings to move them relative to the air in order to produce aerodynamic lift for levitation. Accordingly, the helicopter can stop or hover in the air. However, since the rotor has a size much larger than that of the helicopter body and rotates outside the helicopter body, the rotor is vulnerable to external obstructions, involving the risk of damage. In consequence, there is a disadvantage of the helicopter being subjected to restraints in its operational environment.

Hence, for eliminating this disadvantage, a flying body equipped with a plurality of rotors arranged within the projection contour of the vehicle body as viewed from above is suggested (Patent Document 1). Patent Document 1: Japanese Patent application Laid-Open No. 2004-82999, the entire contents of which are incorporated herein by reference.

Also, an invention designed to provide a fan in the center inside a ring-shaped wing for blowing air in a centrifugal direction for levitation is disclosed (Patent Document 2). The invention assumes the principle of having a ring-shaped wing and radially blowing air from a fan which sends air in the centrifugal direction toward the ring-shaped wing in order to produce aerodynamic lift that generates an air flow on the ring-shaped wing. Patent Document 2: Japanese Patent application Laid-Open No. 2004-168276, the entire contents of which are incorporated herein by reference.

The flying body disclosed in Patent Document 1 has the problem of the incapability of producing adequate aerodynamic lift unless a high output engine is employed, because of the limited size of the rotor housed in the vehicle body.

On the other hand, the flying body disclosed in Patent Document 2 is based on a design in which the fan disposed inside the ring-shaped wing takes in air from the central upper direction or the central up-down direction and sends it toward the ring-shaped wing in the radial direction. As a result, the wing comes into contact with the air flowing from above the wing in the center hole, and the aerodynamic lift is counteracted by the air taken in from below the fan. In other words, when the vehicle body is immobilized in a fixed position, the aerodynamic lift can be produced, but when a load is actually applied to the vehicle body, an amount of air current corresponding to the applied load escapes from the gap between the fan and the center hole of the wing in a direction opposite to that of the load applied. As a result, even if aerodynamic lift is produced on the wing cross-section, an air flow corresponding to the load escapes from the upper side of the fan toward the upper wing surface. Thus, the flying body cannot levitate.

ASPECTS AND SUMMARY OF THE INVENTION

An aspect of the present invention is to respond to one or more of the concerns noted above and herein and provide a flying body capable of eliminating the problems as described above.

In one aspect of the present invention, a flying body according to the preset invention is characterized by (1) an upper blower equipped with rotating blades for pumping air in an axial flow direction, (2) a lower blower equipped with rotating blades for pumping the air pumped from the upper blower in a centrifugal direction, (3) an air blower with the upper blower and the lower blower disposed on the same axis and rotating in the opposite directions to each other, (4) a fixed wing having at least an inner surface formed in a skirt shape providing a circular conical surface, and mounted concentrically with the air blower, and in that (5) the lower blower is mounted below an inner top face of the fixed wing such that the air pumped and sent in the centrifugal direction strikes the circular conical surface of the fixed wing, and (6) a top portion of the fixed wing has no opening except for a passage through which an axial flow is pumped from the upper blower to the lower blower.

According to another advantageous effects of the proposed invention, presented is the above structure, first, when the air pumped and sent in the centrifugal direction strikes the inner circular conical surface of the fixed wing, the flow of air causes a difference in the air pressure between the outside and the inside of the fixed wing, thus producing aerodynamic lift. At this stage, the top portion of the fixed wing has no opening except for a passage through which an axial flow is pumped from the upper blower to the lower blower, and the air from the upper blower is pumped downward from the axial flow passage at all times. Because of this, a amount of air current corresponding to an applied load does not escape in a direction opposite to the load applied and the aerodynamic lift is not counteracted as happens in Patent Document 2.

Additionally, when the air pumped in the centrifugal direction strikes the inner circular conical surface of the fixed wing, the air current is deflected in an oblique downward direction by the angle of slope, thus producing a stress. The stress results in thrust that moves the flying body upward. In this case, since the rotating blades of the lower blower are arranged concentrically with the fixed wing having the inner surface formed in a skirt shape to provide a circular conical surface, the reaction forces produced when the air pumped in the centrifugal direction strikes the inner circular conical surface of the fixed wing come together on the axis, resulting in the action of canceling each other out.

Further, since the upper blower and the lower blower which are equipped with rotating blades are coaxially aligned and rotate in directions opposite to each other, the torques are counterbalanced so as to prevent the fixed wing from rotating.

Still further, since the air is not pumped into the area directly beneath the lower blower which redirects the air that has been pumped in the centrifugal direction in the direction of striking the inner circular conical surface of the fixed wing, the empty space in this area can be used to mount either a flight deck or a freight hold under the lower blower.

Additionally, because the fixed wing serving as the vehicle body of the flying body has the inner surface formed in a skirt shape providing a circular conical surface, when the fixed wing travels in the plane direction, the wing moves relative to the atmosphere, so that a flow of air is produced on the upper and lower faces to produce the thrust.

The flying body according to the present invention is capable of landing on an area in which a lot of obstacles exist, because the flying body does not have a rotor and levitates in the air by producing thrust on and in the fixed wing serving as the vehicle body and also controls the direction of the thrust for flight. For example, the flying body is capable of levitating while the vehicle body is in contact with a multistory building or the like. Because of this, the flying body can be used for a rescue operation in case of fire. In addition, in regard to flight, the flying body is of a flying-wing type in which a fixed wing serves as the vehicle body, and not a plurality of wings, resulting in a simple form. In consequence, the flying body can obviate the problem of a vortex flow caused by a complicated form, leading to a reduction in the area of the flying field required for takeoff and landing. To take another case, when the present invention is applied to a toy aircraft, a rotating propeller or rotor is not required, making it possible to prevent accidents or injury from occurring when such a propeller or rotor comes into contact with persons.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
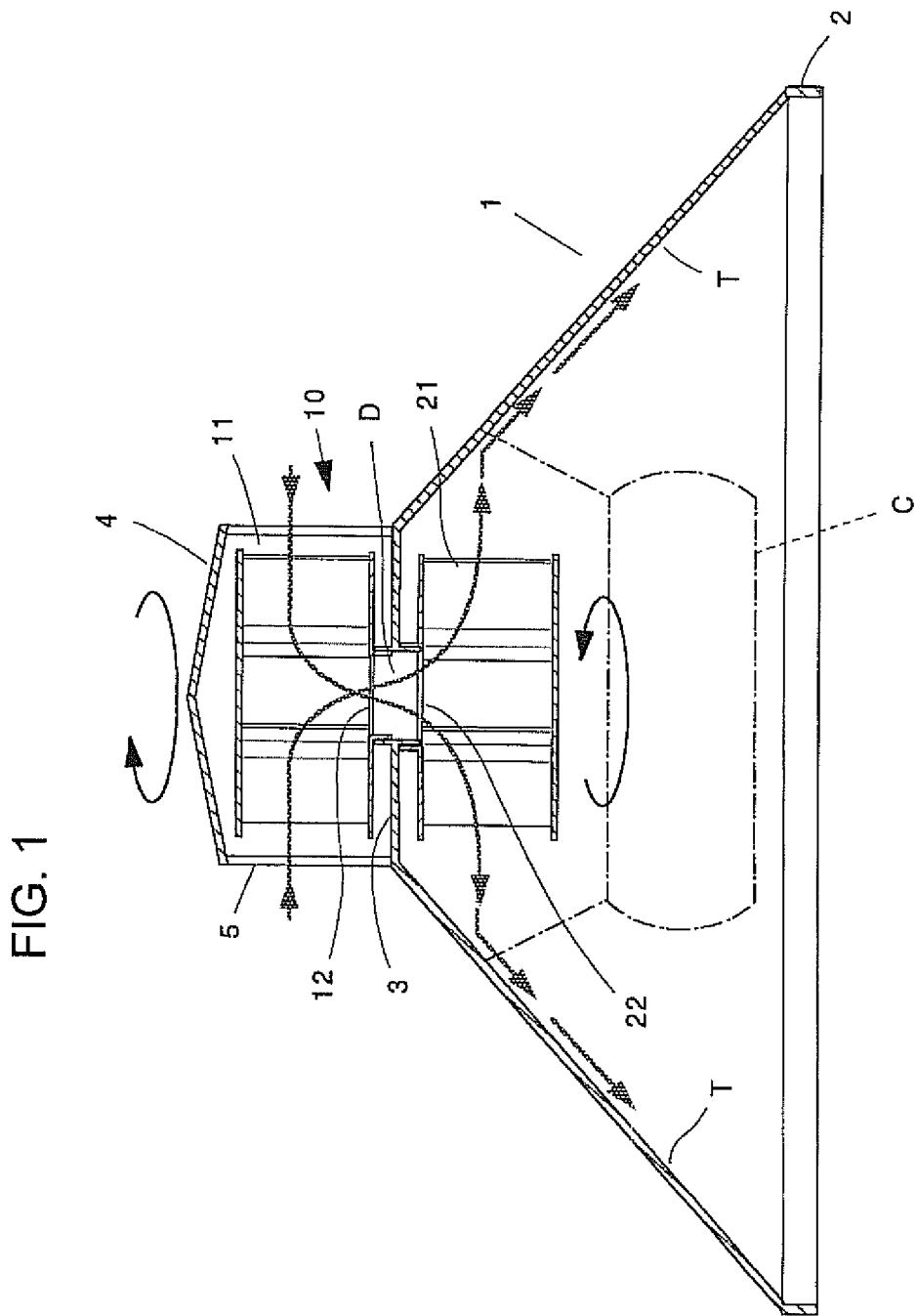
FIG. 1 is a cross-section view of a flying body of the present invention.
Figure 2:
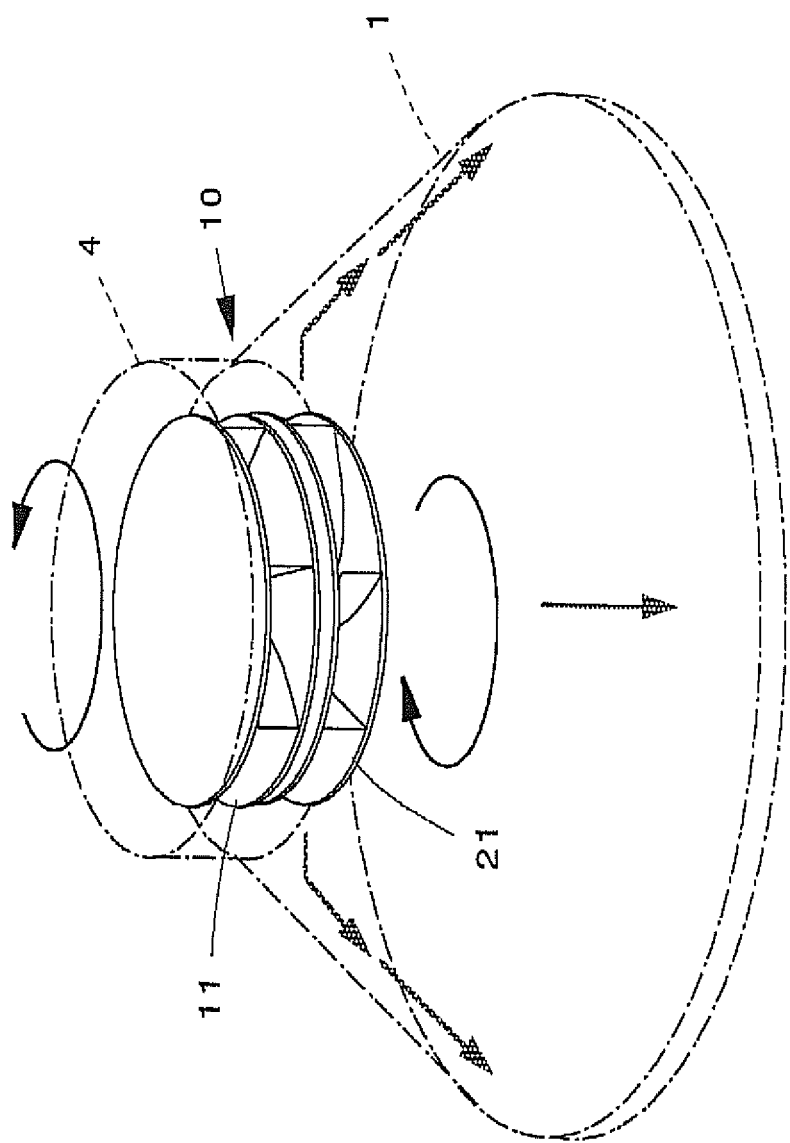
FIG. 2 is a perspective view of the flying body of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Embodiments of a flying body according to the present invention will be described in detail below with reference to the accompanying drawings. FIG. 1 to FIG. 4 illustrate an embodiment of the flying body according to the present invention. In the drawings reference numeral 1 denotes a fixed wing serving as the vehicle body of the flying body. The fixed wing is required to have at least an inner surface formed in a skirt shape providing a circular conical surface T. In the embodiment, the upper portion of the fixed wing 1 is shaped in a truncated cone form so as to form a flat-shaped top plate 3.

Figure 3:
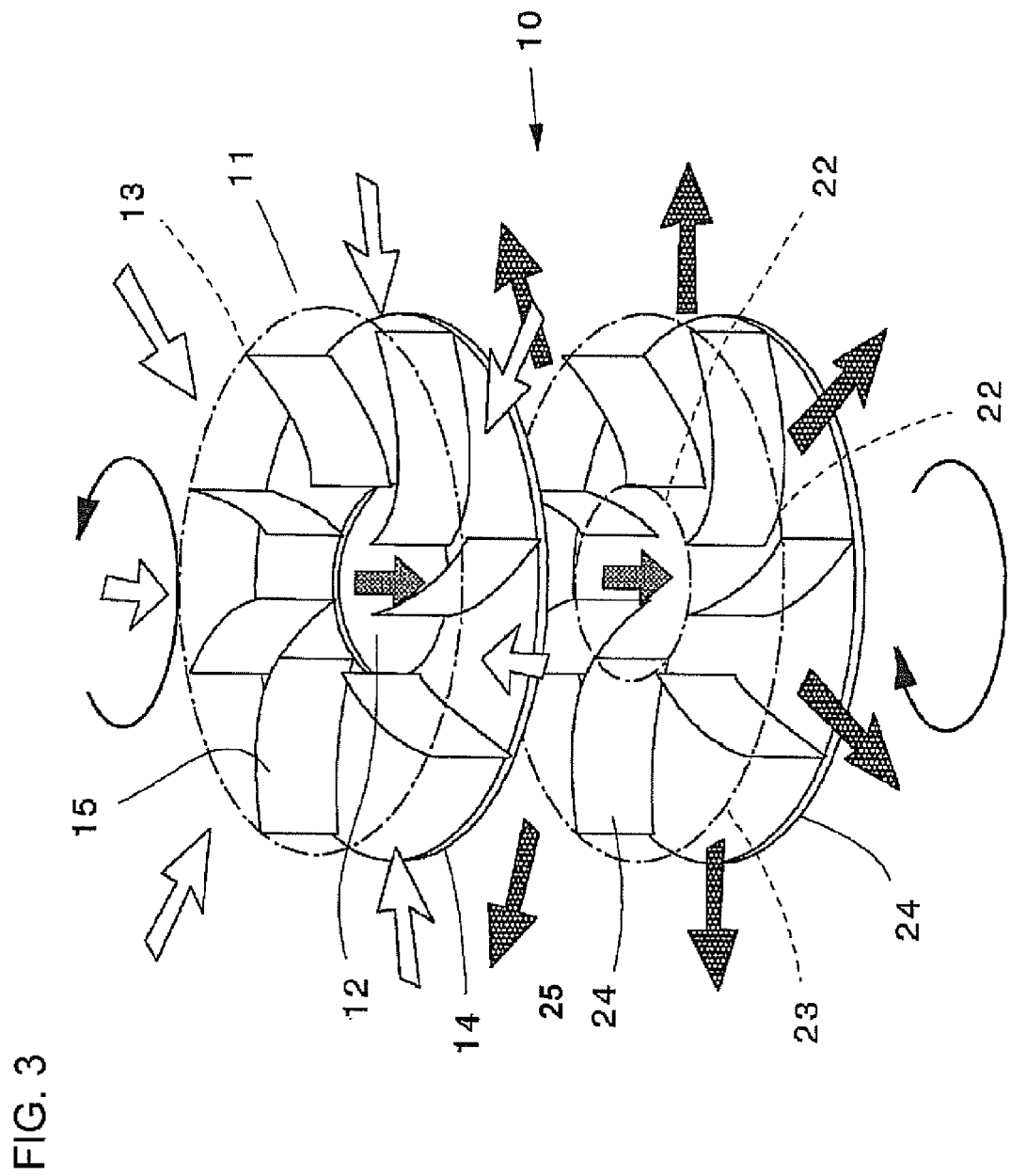
FIG. 3 is an exploded perspective view of an air blower of the flying body of the present invention.
Figure 4:
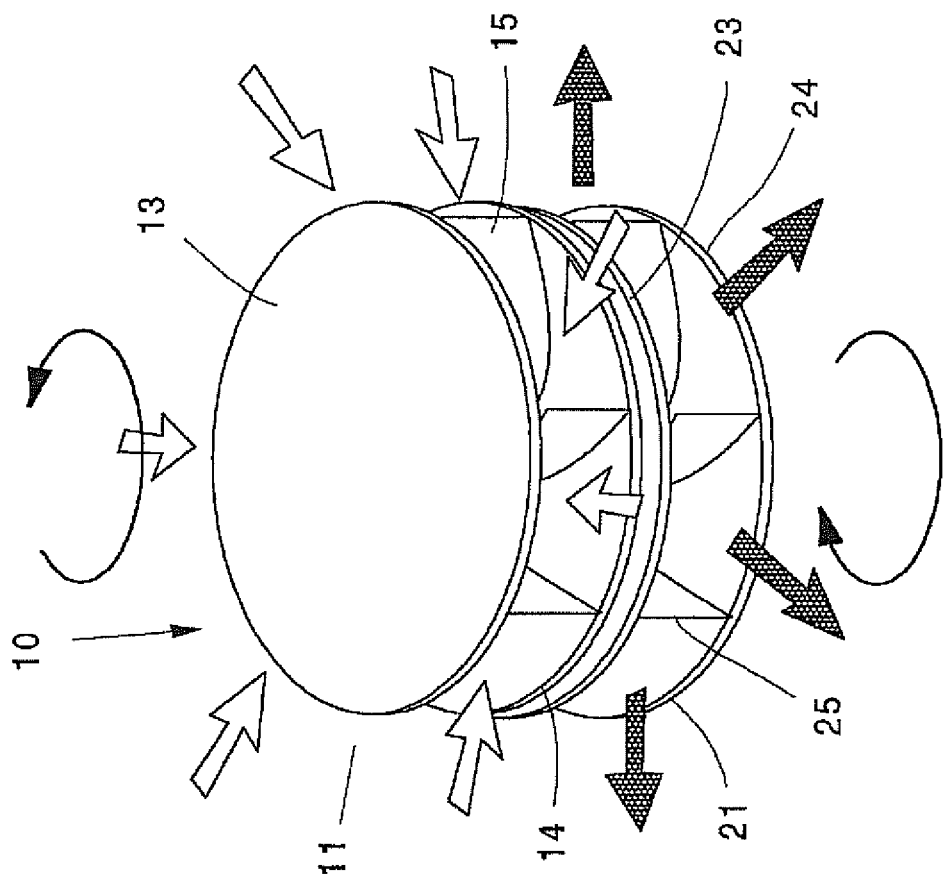
FIG. 4 is a perspective view of the air blower of the flying body of the present invention.

Then, in the drawings reference numeral 10 denotes an air blower which is provided with an upper blower 11 equipped with rotating blades for pumping air in the axial flow direction, and a lower blower 21 equipped with rotating blades for pumping the air pumped from the upper blower 11 in the centrifugal direction, in which the upper blower 11 and the lower blower 21 are disposed on the same axis and rotate in the opposite directions to each other (see FIGS. 3 and 4). In the embodiment, the upper blower 11 is a turbofan provided with blades 15 between a disk 13 with no opening and a disk 14 having a through hole 12 dilled at the center. Likewise, the lower blower 21 is a turbofan provided with blades 25 between a disk 23 with no opening and a disk 24 having a through hole 22 drilled at the center. These turbofans are in phase. The through holes 12 and 22 face each other and are coaxially aligned, and rotate in directions opposite to each other. In the turbofan of the upper blower 11, the intake air from the centrifugal direction is pumped through the through hole 12 in the axis flow direction. Then, in the turbofan of the lower blower 21 the intake air from the through hole 22 is pumped in the centrifugal direction.

The above-described air blower has the upper blower 11 and the lower blower 21 respectively disposed outside and inside of the top portion of the fixed wing 1. Specifically, the upper blower 11 is rotatably mounted on the outer face of the top plate 3 of the fixed wing 1 in the vertical direction. The lower blower 21 is rotatably mounted below the inner face of the top plate 3 in the vertical direction. In this case, the top plate 3 of the fixed wing 1 is required to have no opening except for a passage D through which an axial flow passes from the through hole 12 of the upper blower 11 to the through hole 22 of the lower blower 21 (see FIG. 1).

The air pumped from the lower blower 21 needs to be pumped only in the centrifugal direction. Then, the air pumped and sent as indicated by the arrows in FIGS. 1 and 2 strikes the inner circular conical surface T of the fixed wing 1. The flow of air resulting from the striking causes a difference in the air pressure between the outside and the inside of the fixed wing, thus producing aerodynamic lift. In addition, the air current is deflected in an oblique downward direction by the angle of slope, thus producing a stress acting as thrust that moves the flying body upward. On the other hand, in regard to the upper blower 11, the direction of taking in air is not specially limited. However, in the embodiment, a chamber 4 is provided on the top plate 3 of the fixed wing 1 for housing the upper blower. Vents 5 are provided in the peripheral face of the chamber to take in air from the circumferential direction.

The air blower 10 as described above may be operated by use of a jet engine with a combustion apparatus provided in the passage D through which the pumped axial flow passes, and also by use of an internal combustion engine or a motor to generate rotation.

In the embodiment, the lower end 2 of the fixed wing 1 is not spread out in the circumferential direction, but is folded in the vertical direction. This structure makes it possible to guide straight downward the air current which has been deflected in an oblique downward direction by the angle of slope of the inner face of the fixed wing, resulting in an improvement in thrust efficiency.

In the aforementioned flying body, the aerodynamic lift and thrust for moving the flying body upward in the vertical direction can be produced as described above. Horizontal thrust may be produced by inclining the fixed wing 1, as well as by additionally mounting a thrust generator such as a propeller and a jet engine, examples of which are illustrated in FIG. 5 to FIG. 8.

Figure 5:
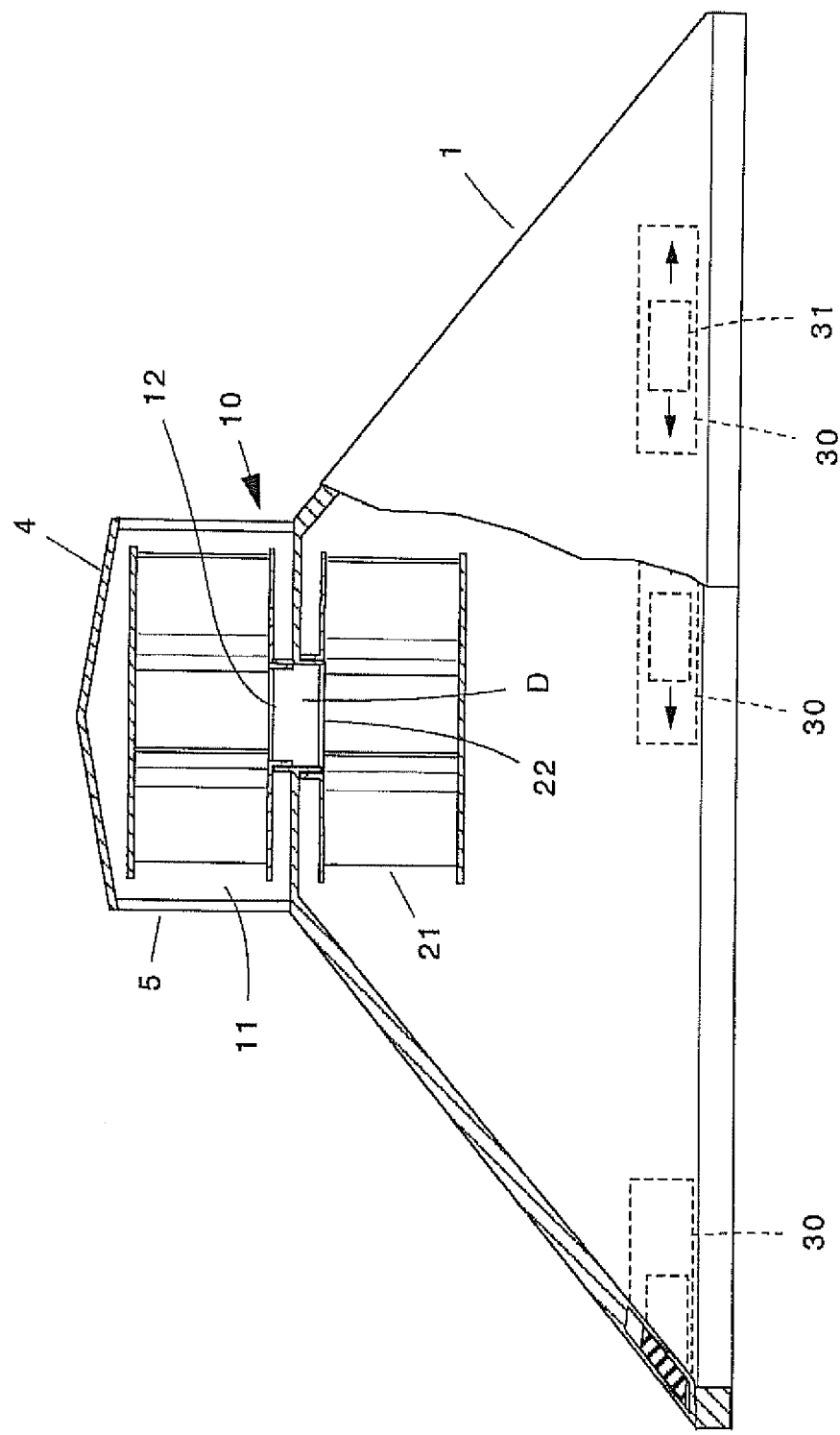
FIG. 5 is a normal cross-section view of a first embodiment in which thrust is produced in the horizontal direction of the flying body of the present invention.

FIG. 5 is a diagram showing an example of producing horizontal thrust by changing the balance of the center of gravity of the fixed wing 1 to incline the fixed wing. In this example, balance apparatuses 30 each having a movable weight 31 in the circumferential direction are arranged on a plurality of portions (three portions in FIG. 5) of the circumference of the fixed wing 1. The gravity balance is changed by changing the location of the weight mounted in each balance apparatus.

Figure 6:
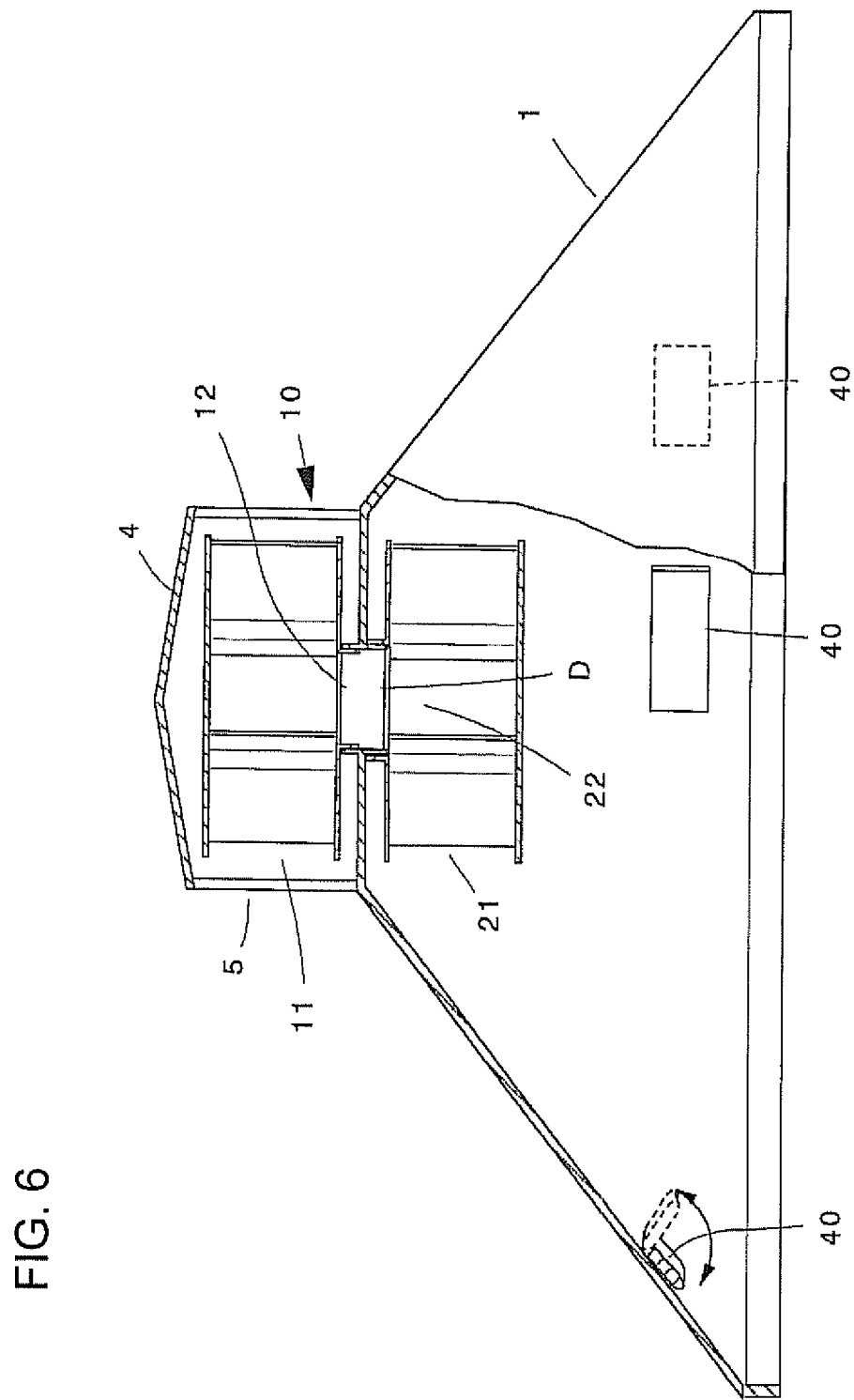
FIG. 6 is a normal cross-section view of a second embodiment in which thrust is produced in the horizontal direction of the flying body of the present invention.

FIG. 6 illustrates an example of means for producing horizontal thrust by changing the balance of the air from the lower blower 21 striking the circular conical surface T of the fixed wing 1 in order to incline the fixed wing. In this example, diffusers 40 capable of moving up and down are disposed in selected portions (three portions in FIG. 6) of the circular conical surface T of the fixed wing 1, thereby changing the balance of the air from the lower blower striking the circular conical surface of the fixed wing.

Figure 7:
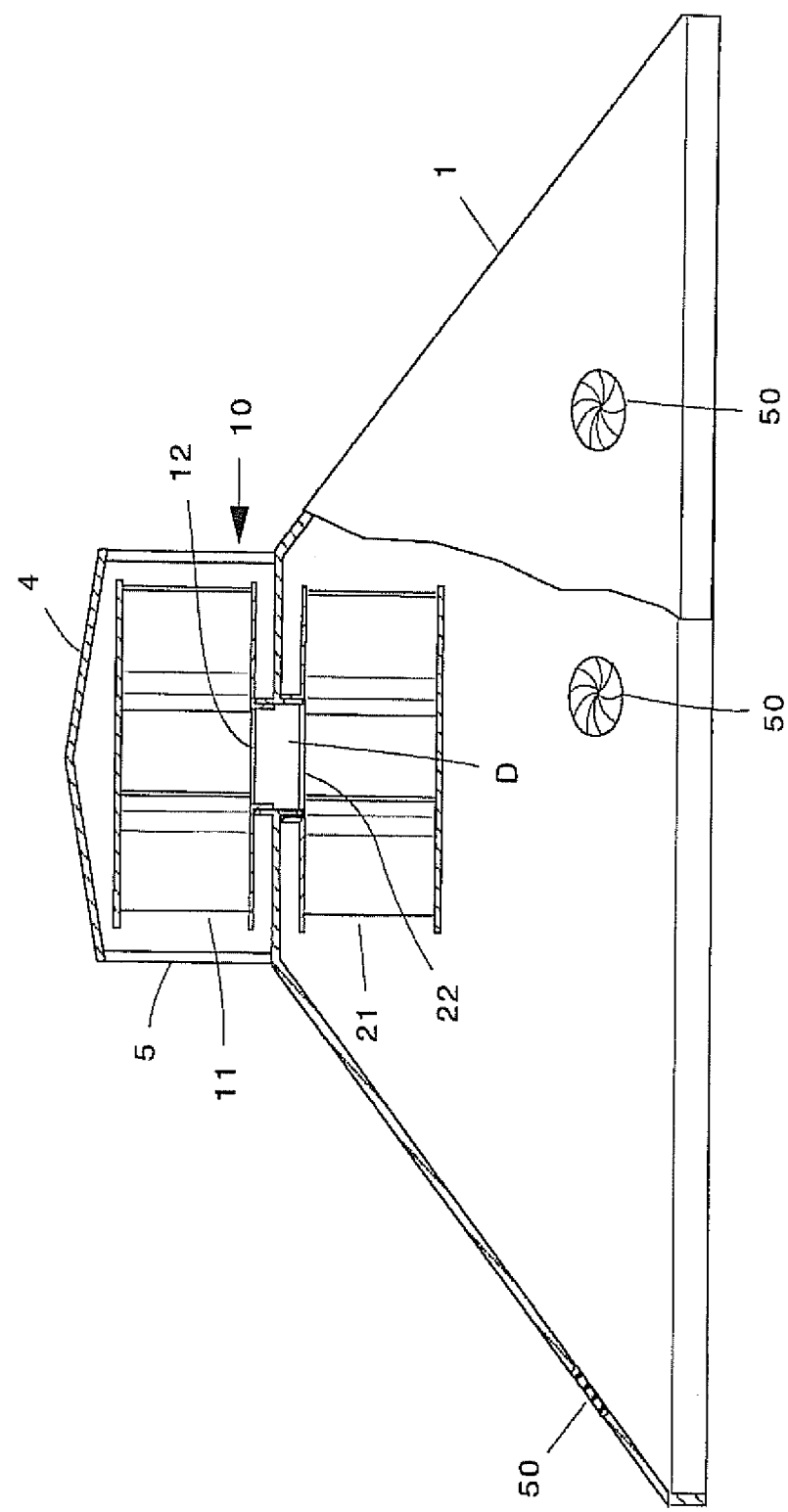
FIG. 7 is a normal cross-section view of a third embodiment in which thrust is produced in the horizontal direction of the flying body of the present invention.

FIG. 7 illustrates another example of means for producing horizontal thrust by changing the balance of the air from the lower blower 21 striking the circular conical surface T of the fixed wing 1 in order to incline the fixed wing. In this example, through holes 50 capable of opening and closing are disposed in selected portions (three portions in FIG. 7) of the circular conical surface T of the fixed wing 1, thereby changing the balance of the air from the lower blower striking the circular conical surface of the fixed wing.

Figure 8:
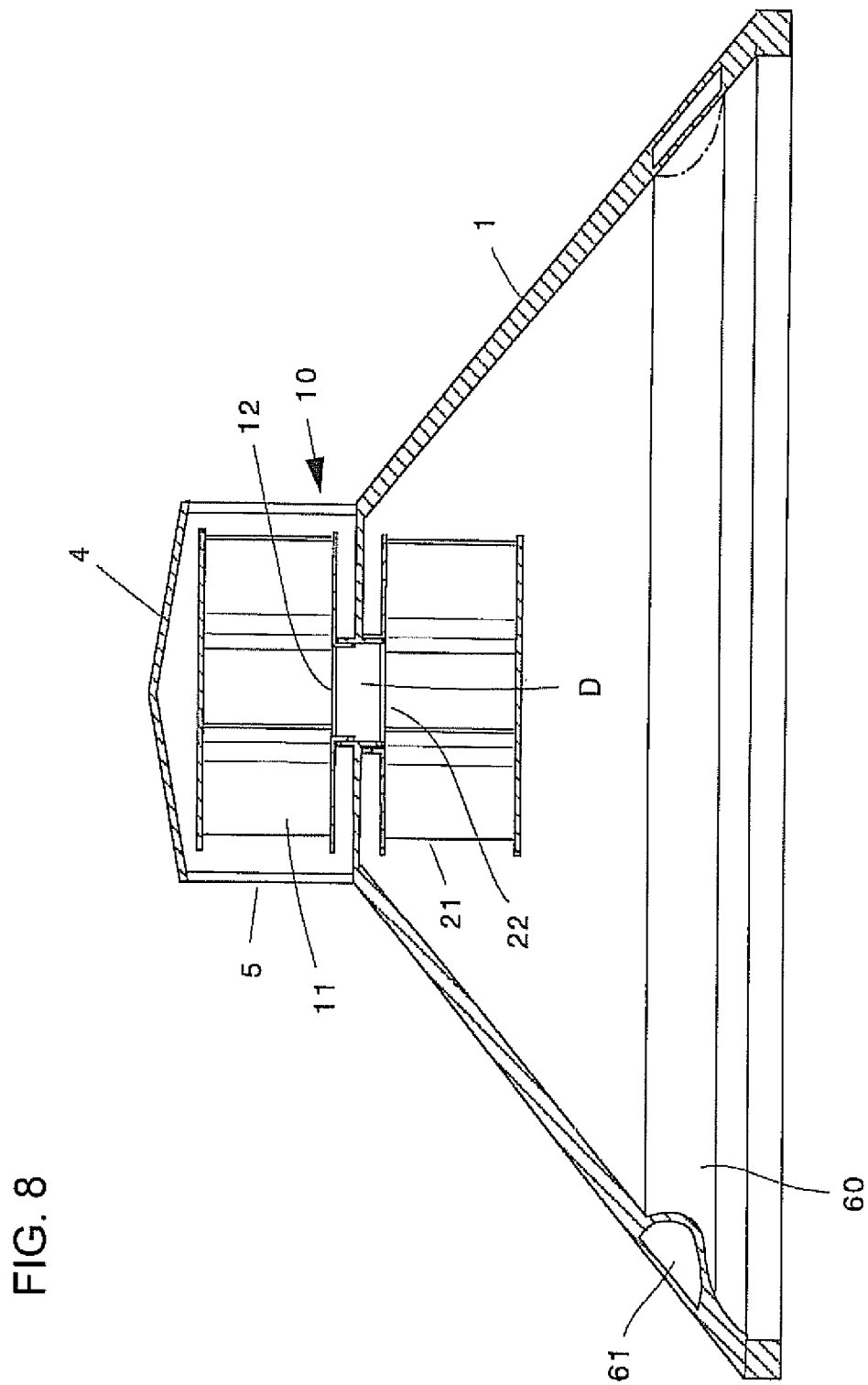
FIG. 8 is a normal cross-section view of a fourth embodiment in which thrust is produced in the horizontal direction of the flying body of the present invention.

FIG. 8 illustrates another example of means for producing horizontal thrust by changing the balance of the air from the lower blower 21 striking the circular conical surface T of the fixed wing 1 in order to incline the fixed wing. In this example, the circular conical surface T of the fixed wing 1 can be flexibly changed in size as appropriate, thereby changing the balance of the air from the lower blower that strikes the circular conical surface of the fixed wing. Specifically, in this example, a bar-shaped flexible area 60 expanding and shrinking in the axis direction is provided on the inner periphery of the fixed wing 1 in order to expand/shrink selected portions on the circumference. Such expanding/shrinking can be attained by moving a cam in a hollow portion 61 of the flexible area 60 or by filling the hollow portion 61 with a fluid.

The present invention having a structure as described above is applicable to a toy aircraft as well as to a manned aircraft and an unmanned aircraft. In the application to a manned aircraft or the unmanned aircraft, a flight deck or a freight hold C can be mounted under the lower blower 21 in the fixed wing 1 as illustrated in FIG. 1. In this case, the lower blower 21 pumps air in the centrifugal direction so as to make the air strike the circular conical surface inside the fixed wing 1, so that the air is not pumped downward from the lower blower 21, making it possible to attain a layout as described above.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A flying body,
an air blower further comprising:
    an upper blower equipped with rotating blades for pumping air in an axial flow direction; and
    a lower blower equipped with rotating blades for pumping the air pumped from the upper blower in a centrifugal direction;
    the upper blower and the lower blower disposed on the same axis and rotating in the opposite directions to each other during a use thereof; and
a fixed wing having at least an inner surface formed in a skirt shape providing a circular conical surface; and said fixed wing being mounted concentrically with the air blower,
wherein the lower blower being mounted below an inner top face of the fixed wing such that during said use there is flow communication for the air pumped and sent in the centrifugal direction strikes the circular conical surface of the fixed wing, and
a top portion of the fixed wing has no opening except for a passage through which an axial flow is pumped from the upper blower to the lower blower,
wherein said rotating blades of the upper blower are a turbofan provided with blades between two disks, one of which has no opening and the other of which has a through hole dilled at a center,
the through hole of the turbofan of the upper blower and a through hole of a turbofan of the lower blower facing each other and being coaxially aligned, and rotatable during said use in directions opposite to each other such that during said use the turbofan of the upper blower is in flow communication to pump the intake air from the centrifugal direction through the through hole in the axis flow direction; and
the turbofan of the lower blower effective to pump the intake air from the through hole of the upper blower in the centrifugal direction.

2. The flying body, according to claim 1, further comprising:
   at least one of a flight deck and a freight hold; and
   said at least one of a flight deck and a freight hold being operatively mounted vertically under the lower blower.

3. The flying body according to claim 1, further comprising:
   means for producing thrust acting in a horizontal direction including a change in the gravity balance of the fixed wing.

4. The flying body according to claim 1, further comprising:
   means for producing thrust acting in a horizontal direction including a change in the balance of the air from the lower blower striking the circular conical surface of the fixed wing.

5. The flying body according to claim 4, further comprising:
   means for changing the balance of the air from the lower blower striking the circular conical surface of the fixed wing; and
   said means for changing the balance of the air from the lower blower further comprises:
      diffusers capable of moving up and down in selected portions of the circular conical surface of the fixed wing.

6. The flying body according to claim 4, further comprises:
   means for changing the balance of the air from the lower blower striking the circular conical surface of the fixed wing; and
   said means for changing the balance of the air from the lower blower further comprises:
      means to dispose through holes and said holes including means for opening and closing in selected portions of the circular conical surface of the fixed wing.

7. The flying body according to claim 4, further comprising:
   means for changing the balance of the air from the lower blower striking the circular conical surface of the fixed wing; and
   said means for changing the balance of the air from the lower blower comprises:
      means for flexibly changing a shape of the circular conical surface of the fixed wing.

8. The flying body according to claim 1, further comprising:
   means for producing thrust acting in a horizontal direction including at least one of:
      a change in the gravity balance of the fixed wing; and a change in the balance of the air from the lower blower striking the circular conical surface of the fixed wing.

9. The flying body according to claim 8, further comprising:
   means for changing the balance of the air from the lower blower striking the circular conical surface of the fixed wing; and
   said means for changing the balance of the air from the lower blower further comprises:
      diffusers capable of moving up and down in selected portions of the circular conical surface of the fixed wing.

10. The flying body according to claim 8, further comprises:
    means for changing the balance of the air from the lower blower striking the circular conical surface of the fixed wing; and
    said means for changing the balance of the air from the lower blower further comprises:
       means to dispose through holes and said holes including means for opening and closing in selected portions of the circular conical surface of the fixed wing.

11. The flying body according to claim 8, further comprising:
    means for changing the balance of the air from the lower blower striking the circular conical surface of the fixed wing; and
    said means for changing the balance of the air from the lower blower comprises:
       means for flexibly changing a shape of the circular conical surface of the fixed wing.

12. A flying body comprising:
    an air blower further comprising: an upper blower equipped with rotating blades for pumping air in an axial flow direction; a lower blower equipped with rotating blades for pumping the air pumped from the upper blower in a centrifugal direction; wherein the upper blower and the lower blower disposed on the same axis and rotating in the opposite directions to each other during a use thereof; and
    a fixed wing having at least an inner surface formed in a skirt shape providing a circular conical surface; and said fixed wing being mounted concentrically with the air blower,
    wherein the lower blower being mounted below an inner top face of the fixed wing such that during said use there is flow communication for the air pumped and sent in the centrifugal direction strikes the circular conical surface of the fixed wing,
    a top portion of the fixed wing has no opening except for a passage through which an axial flow is pumped from the upper blower to the lower blower,
    said rotating blades of the upper blower are a turbofan provided with blades between two disks, one of which has no opening and the other of which has a through hole dilled at a center,
    the through hole of the turbofan of the upper blower and a through hole of a turbofan of the lower blower facing each other and being coaxially aligned, and rotatable during said use in directions opposite to each other such that during said use the turbofan of the upper blower is in flow communication to pump the intake air from the centrifugal direction through the through hole in the axis flow direction;
    the turbofan of the lower blower effective to pump the intake air from the through hole of the upper blower in the centrifugal direction; and
    means for producing thrust acting in a horizontal direction including at least one of:
       a change in the gravity balance of the fixed wing; and a change in the balance of the air from the lower blower striking the circular conical surface of the fixed wing.

13. The flying body according to claim 12, further comprising:
    means for changing the balance of the air from the lower blower striking the circular conical surface of the fixed wing; and
    said means for changing the balance of the air from the lower blower further comprises:
       diffusers capable of moving up and down in selected portions of the circular conical surface of the fixed wing.

14. The flying body according to claim 12, further comprises:

means for changing the balance of the air from the lower blower striking the circular conical surface of the fixed wing; and said means for changing the balance of the air from the lower blower further comprises:
means to dispose through holes and said holes including means for opening and closing in selected portions of the circular conical surface of the fixed wing.

15. The flying body according to claim 12, further comprising:
means for changing the balance of the air from the lower blower striking the circular conical surface of the fixed wing; and
said means for changing the balance of the air from the lower blower comprises at least one of a means for flexibly changing a shape of the circular conical surface of the fixed wing.

* * * * *